Figure 1:
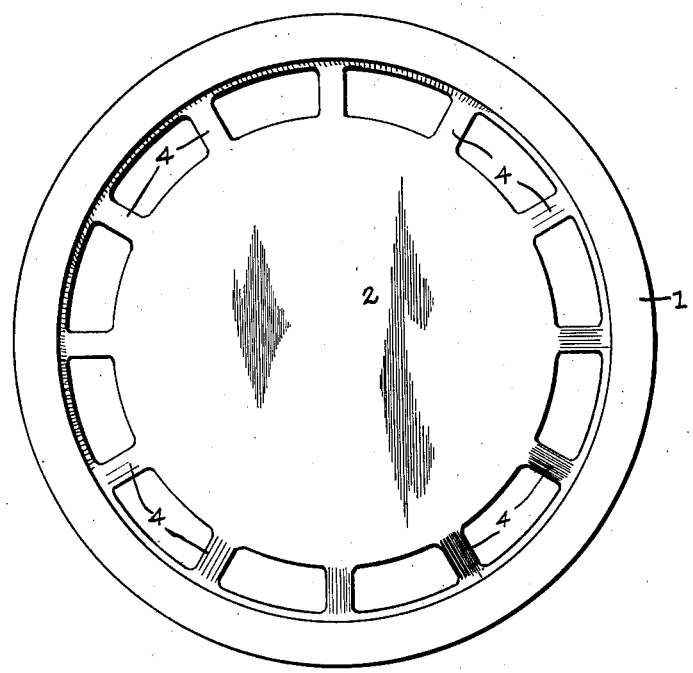

Feb. 9, 1926. 1,572,168

H. E. SMITH

COOKING APPARATUS

Filed Nov. 8, 1924

Harold Elno Smith
Inventor
by Smith & Freeman
Attorneys

Patented Feb. 9, 1926.

1,572,168

UNITED STATES PATENT OFFICE.

HAROLD ELNO SMITH, OF CLEVELAND HEIGHTS, OHIO.

COOKING APPARATUS.

Application filed November 8, 1924. Serial No. 748,591.

*To all whom it may concern:*

Be it known that I, HAROLD ELNO SMITH, a citizen of the United States of America, and a resident of Cleveland Heights, in the county of Cuyahoga and State of Ohio, have invented certain new and useful Improvements in Cooking Apparatus, of which the following is a full, clear, and exact description.

This invention relates to cooking apparatus and has for its object to expedite cooking operations, minimize the use of fuel or electricity, and decrease the proportion of heat wasted in the air of the room. The use of aluminum for cooking utensils has become so common as largely to displace other utensils from the kitchen. Aluminum has substantial advantages in respect of lightness, attractiveness, and high heat conductivity, but exhibits the peculiarity of an extremely low rate of absorbing or emitting radiations, especially when cleaned and polished. Gas stoves are ordinarily used with a skeleton plate above a naked flame, so as to obtain direct impingement of the flame upon the bottom of the cooking utensil, but an aluminum utensil, when exposed directly to such a flame, is heated only with considerable difficulty, unless it chances to possess a dirty bottom which few housewives will permit. The only modes in which the heat from a flame can be transmitted to a utensil are by radiation or by actual physical contact of the gas molecules with the surface of the metal, and this contact cannot possibly occur in more than a limited number of cases and the present theories of atomic structure render such contact almost unthinkable, thereby leaving radiation as the sole possible method of heating. Many electric heaters are also made of wire coils carried by non-conducting supports and produce their effect essentially by radiant heat.

My invention comprehends the use over each heat source of a plate of metal having a high coefficient of heat absorption, a low total heat capacity, and a suitable degree of insulation against heat conduction to other parts of the stove, this device serving as a support for the aluminum utensil. It is also valuable with other utensils of low absorption coefficient such as certain enamels and glasses. In the drawings accompanying and forming a part of this application I have shown certain physical forms in which my inventive idea can be embodied, though it will be understood that these are intended to be only illustrative of the general principles of my invention and to the detail methods of its application.

Figure 2:
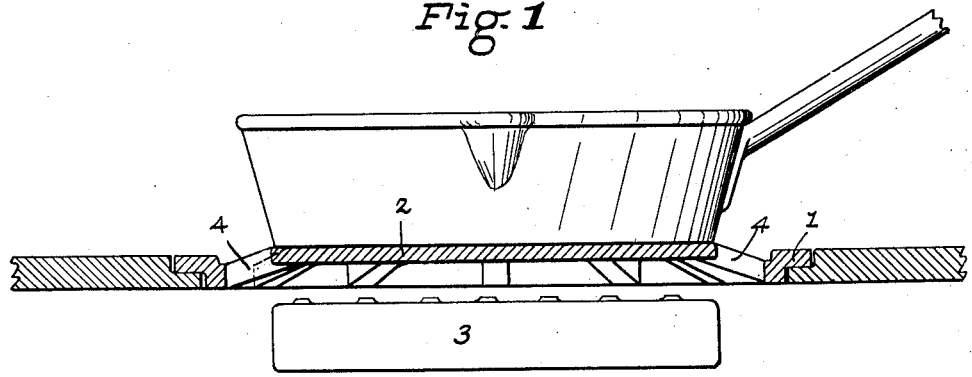

Fig. 1 is a perspective view of a simple form of stove plate embodying my invention; Fig. 2 is a sectional view of a part of a gas stove showing an aluminum cooking utensil in combination with my improved hot plate; and Figs. 3 and 4 illustrate modified forms of my invention.

Describing the parts by reference characters, 1 denotes a circular ring adapted to fit a standard stove-hole, and 2 a flat circular metal plate carried by said ring and adapted to overlie the gas burner 3 at a little distance, the portion 2 being supported from the ring 1 in such wise as to diminish the conduction of heat thereto. This may be simply and conveniently effected by connecting the parts with integral arms 4 of comparatively small width and thickness so as to reduce the cross sectional area available for conduction. When made in this way the device is generally cast in one piece, and the most successful material therefor is an alloy of chromium with one or more iron group metals, especially a quaternary alloy of iron, chromium, nickel, and silicon which is very resistant to corrosion at high temperatures and withstands warping or disintegration even after prolonged heating. Examples of successful alloys are: Iron 40% to 75%, chromium 15% to 25%, nickel 5% to 40%; and Monel metal. It is desirable that the plate 2 be made thin in order to facilitate heat conduction from the flame to the cooking utensil and to reduce the heat capacity.

Figure 3:
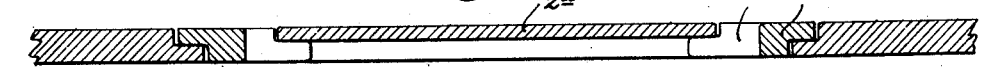
Figure 4:
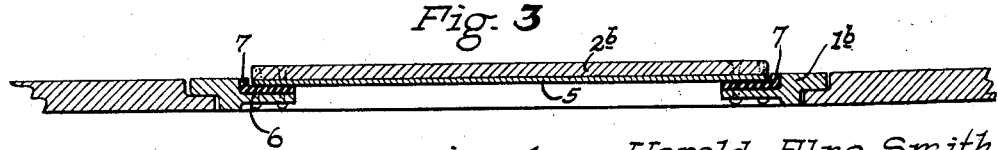

It is not necessary, however, that the device be made all in one piece since, as shown in Fig. 3, the plate $2^a$ may be made separate from the remaining parts. In this case the ring $1^a$ and arms $4^a$ may well be made of ordinary cast iron, and the plate $2^a$ be made of a chromium alloy, or copper or other metal may be used. A still better although more expensive arrangement is shown in Fig. 4 wherein the top plate $2^b$ of aluminum or nickel or other metal of low absorption coefficient is united to a second plate or layer 5 of some other material which shall absorb heat more readily and transmit it to the working surface. This may be a second metallic plate of substantial thickness, mechanically united to the top plate, or a metal layer of small thickness suitably applied to the aluminum as by plating; or it may even consist of a non-metallic layer serving to increase the absorption coefficient, such as certain enamels. In this case I have shown the ring 1ᵇ as formed at its inner margin with an annular recess 6 for the reception of the heating plate, an insulating layer 7 of suitable material such as mica being employed to minimize loss of heat by conduction. The device shown in Fig. 4 is peculiar in that only a small amount of heat is radiated from the plate so that a stove equipped entirely with devices of this nature, although run at full capacity, generates only a small amount of sensible heat owing to the low radiating coefficient of the exposed plate, although a cooking dish placed in contact therewith becomes heated in a minimum of time owing to the high rate of conduction.

It will be understood that many changes can be made in the details of the application of my invention wherefore I do not limit myself except as specifically recited in my several claims.

Having thus described my invention what I claim is:

1. A stove lid for use with aluminum utensils comprising a flat circular plate of conducting material whose lower face exhibits a coefficient of absorption higher than that of the aluminum, a supporting ring, and means for supporting said plate from said ring while impeding transfer of heat from said plate to said ring.

2. The combination with an aluminum utensil and a source of radiant heat of a metallic plate made of a metal having a high coefficient of absorption located in heat absorbing relation to such source and in heat conducting relation with such utensil, the area of said plate being substantially the same as the area of the utensil with which it contacts and said plate being thermally insulated from adjacent objects.

3. Cooking apparatus comprising a food receiving utensil made of a substance of low absorption coefficient, a circular plate of substantially the same size as said utensil adapted to have said utensil placed thereon, a source of radiant heat beneath said plate, and means for mechanically supporting and thermally insulating said plate, the face of said plate which is presented toward said heat source having a coefficient of absorption substantially greater than that of said utensil.

4. The combination with a stove having a top plate provided with an opening and a source of heat localized beneath said opening, of a metal plate supported in said opening, and means insulating said plate thermally from said top plate, said plate having a coefficient of heat absorption greater than that of the utensil which is placed thereon.

5. Cooking apparatus comprising the combination with a source of radiant heat, of a plate carried by said support in heat absorbing relation to said source, said plate being formed upon the side toward said source with a surface of high radiation absorption coefficient and upon the side away from said source with a surface of low radiation absorption coefficient.

6. Cooking apparatus comprising the combination with a source of radiant heat, a support located out of heat absorbing relation therewith, a plate carried by said support in heat absorbing relation to said source, said plate being formed upon the side toward said source with a surface of high radiation absorption coefficient and upon the side away from said source with low radiation absorption coefficient, and means insulating said plate thermally from said support.

In testimony whereof, I hereunto affix my signature.

HAROLD ELNO SMITH.